United States Patent
Hedges et al.

(10) Patent No.: US 11,072,129 B2
(45) Date of Patent: Jul. 27, 2021

(54) METHOD AND APPARATUS FOR ASSEMBLING A WIND TURBINE BLADE HAVING AN INTERNAL WEB

(71) Applicant: Vestas Wind Systems A/S, Aarhus N. (DK)

(72) Inventors: Andrew Hedges, Surbiton (GB); Arne Haahr, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 222 days.

(21) Appl. No.: 16/477,281

(22) PCT Filed: Jan. 10, 2018

(86) PCT No.: PCT/DK2018/050004
§ 371 (c)(1),
(2) Date: Jul. 11, 2019

(87) PCT Pub. No.: WO2018/130257
PCT Pub. Date: Jul. 19, 2018

(65) Prior Publication Data
US 2019/0358911 A1    Nov. 28, 2019

(30) Foreign Application Priority Data
Jan. 12, 2017 (DK) .......................... PA 2017 70020

(51) Int. Cl.
*B32B 41/00* (2006.01)
*B29C 65/48* (2006.01)
(Continued)

(52) U.S. Cl.
CPC ...... *B29C 65/4835* (2013.01); *B29C 65/7841* (2013.01); *B29C 66/131* (2013.01);
(Continued)

(58) Field of Classification Search
CPC ............ B29C 65/4835; B29C 65/7841; B29C 66/131; B29C 66/301; B29C 66/532;
(Continued)

(56) References Cited

U.S. PATENT DOCUMENTS

| 8,454,791 B2 | 6/2013 | Gau |
| 2009/0148300 A1 | 6/2009 | Driver et al. |

(Continued)

FOREIGN PATENT DOCUMENTS

| CN | 101979239 A | 2/2011 |
| CN | 102022254 A | 4/2011 |

(Continued)

OTHER PUBLICATIONS

China National Intellectual Property Administration, First Notification of Office Action in CN Application No. 201880011105.3, dated Oct. 9, 2020.
(Continued)

*Primary Examiner* — Michael N Orlando
*Assistant Examiner* — Joshel Rivera
(74) *Attorney, Agent, or Firm* — Wood Herron & Evans LLP

(57) ABSTRACT

A method and apparatus for assembling a wind turbine blade (10) including first and second outer shell portions (16, 18) and an internal web (12) are provided. An adhesive material (42) is applied to a top end (30) of the internal web (12) as well as the edges (62, 64) of the first outer shell portion (16) for connection to the second outer shell portion (18). Localized heat energy is applied to pre-cure the adhesive material (42) at the top end (30) of the internal web (12) before applying heat energy to fully cure all of the adhesive material (42) in the wind turbine blade (10). The pre-curing is performed by a removable localized heater device (72), and it assures that the integrity of the bond between the
(Continued)

internal web (12) and the second outer shell portion (18) is maintained during the full curing of the blade (10), when temporary thermal deformation of the outer shell (14) sometimes occurs.

16 Claims, 8 Drawing Sheets

(51) Int. Cl.
  *B29C 65/78* (2006.01)
  *B29C 65/00* (2006.01)
  *F03D 1/06* (2006.01)
  *B29L 31/08* (2006.01)
(52) U.S. Cl.
  CPC .......... *B29C 66/301* (2013.01); *B29C 66/532* (2013.01); *B29C 66/543* (2013.01); *B29C 66/61* (2013.01); *B29C 66/721* (2013.01); *B29C 66/91441* (2013.01); *F03D 1/0683* (2013.01); *B29L 2031/085* (2013.01); *F05B 2230/41* (2013.01); *F05B 2230/61* (2013.01); *F05B 2240/221* (2013.01); *F05B 2240/302* (2013.01)
(58) Field of Classification Search
  CPC ..... B29C 66/543; B29C 66/61; B29C 66/721; B29C 66/91441; B29C 2031/085; B29C 66/1122; B29C 66/9121; B29C 66/961; B29C 66/636; B29C 66/524; B29C 66/112; B29C 66/919; B29C 65/18; B29C 65/30; B29C 65/7802; F03D 1/0683; F03D 1/0675; F05B 2230/41; F05B 2230/61; F05B 2240/221; F05B 2240/302; Y02E 10/72; Y02P 70/50; B29D 99/0028

USPC ................... 156/60, 64, 350, 351, 378, 379
See application file for complete search history.

(56) References Cited

U.S. PATENT DOCUMENTS

| | | | |
|---|---|---|---|
| 2013/0333823 | A1* | 12/2013 | Hedges ................. B29C 70/543 156/93 |
| 2014/0119935 | A1 | 5/2014 | Daenekas et al. |
| 2016/0275827 | A1 | 9/2016 | Winter |
| 2017/0030330 | A1* | 2/2017 | Caruso ................. F03D 1/0675 |
| 2017/0151710 | A1* | 6/2017 | Barlag ............... B29D 99/0014 |
| 2018/0058422 | A1* | 3/2018 | Yarbrough ............ B29C 70/443 |

FOREIGN PATENT DOCUMENTS

| | | |
|---|---|---|
| CN | 102748243 A | 10/2012 |
| CN | 102806665 A | 12/2012 |
| CN | 103057126 A | 4/2013 |
| CN | 105934328 A | 9/2016 |
| EP | 1657453 A2 | 5/2006 |
| EP | 2261501 A2 | 12/2010 |
| EP | 2481914 A1 | 8/2012 |
| EP | 2697506 B1 | 6/2015 |
| WO | 2009139619 A1 | 11/2009 |
| WO | 2013084275 A1 | 6/2013 |

OTHER PUBLICATIONS

Danish Patent and Trademark Office, Search and Examination Report in PA 2017 70020, dated Jun. 7, 2017.
European Patent Office, International Search Report and Written Opinion in PCT Application Serial No. PCT/DK2018/050004, dated Mar. 12, 2018.

* cited by examiner

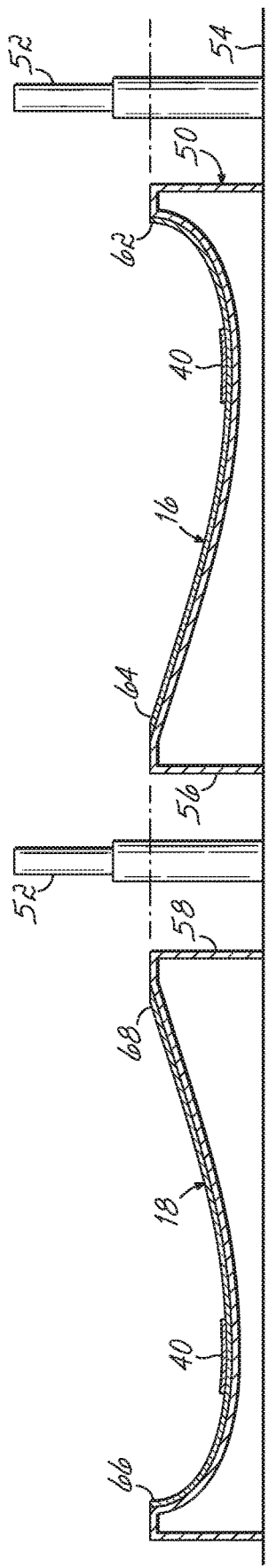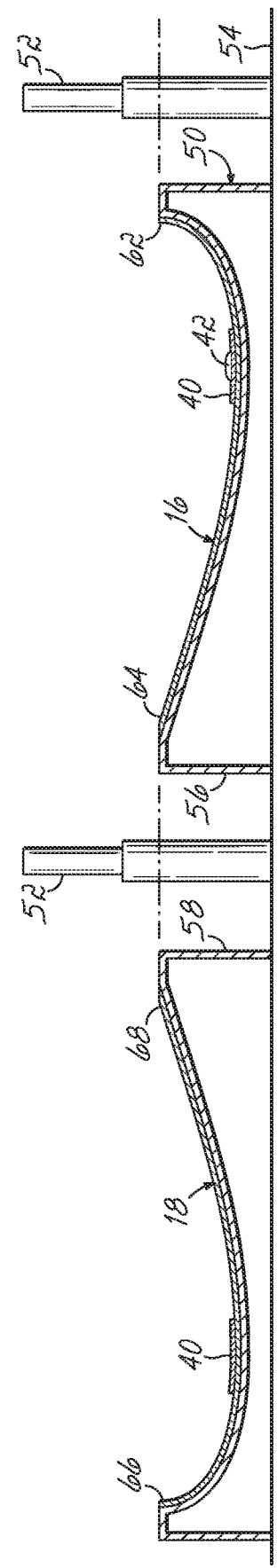

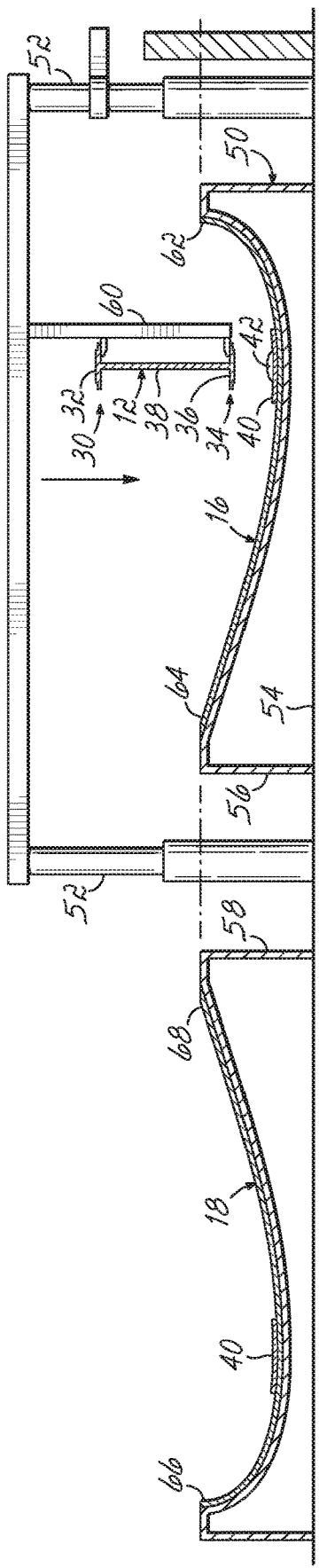
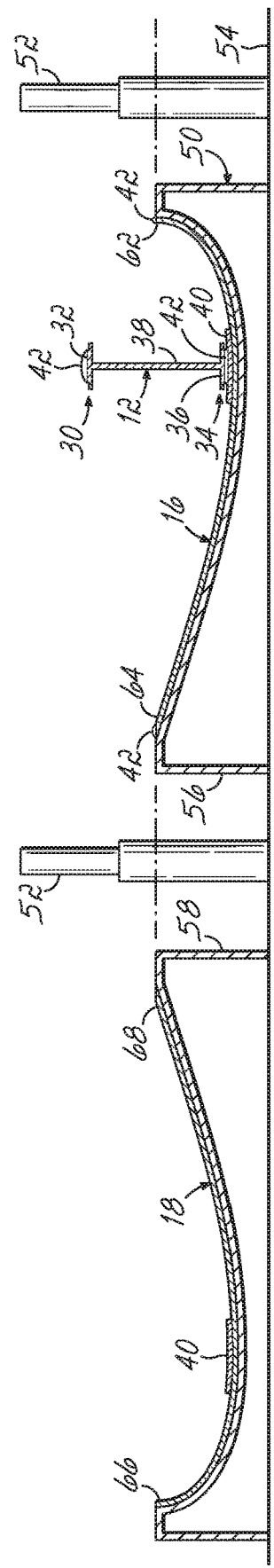

METHOD AND APPARATUS FOR ASSEMBLING A WIND TURBINE BLADE HAVING AN INTERNAL WEB

TECHNICAL FIELD

The present invention relates generally to wind turbine blades, and more particularly, to manufacture and assembly of wind turbine blades including internal structural reinforcements such as internal webs combined with an outer shell to form the blade.

BACKGROUND

Wind turbines are used to produce electrical energy using a renewable resource (wind energy in the ambient environment) and without combusting a fossil fuel. Generally, a wind turbine converts kinetic wind energy into mechanical energy and then subsequently converts the mechanical energy into electrical energy. A common type of wind turbine is the single rotor horizontal-axis wind turbine, although multi rotor wind turbines are also used frequently. As well understood, an exemplary single rotor wind turbine includes a tower defining a support structure, a nacelle located at the apex of the tower, and a rotor having a central rotor hub and one or more blades (e.g., three blades) mounted on the hub and extending radially therefrom. The rotor is supported by the nacelle and positioned at the front of the nacelle so that the rotor faces into the wind upstream of its supporting tower. The rotor may be coupled either directly or indirectly with a generator housed inside the nacelle and configured to convert the mechanical energy of the rotor to electrical energy.

As the wind turbine blades are the elements which capture the wind energy to produce mechanical energy in the form of rotor rotation, these elements must be manufactured to withstand significant loadings and stress, which can also highly vary over time during operation as well. Furthermore, especially in larger capacity wind turbines or wind turbines with only one rotor, the wind turbine blades often define highly elongated blade lengths to sweep through a sufficient area to capture the wind energy necessary to produce the higher amounts of electrical energy. Of course, the longer a wind turbine blade becomes, the more strength and stiffness needs to be provided in the construction or materials of the blade to withstand the associated loads from the wind. In this regard, one typical method of strengthening a wind turbine blade is to add one or more internal webs, sometimes called shear webs, to be connected between first and second outer shell portions, which define the aerodynamic profile of the wind turbine after they are connected together. The internal web(s) provide additional rigidity to the outer shell portions for the purposes of withstanding the erratic and high loading encountered during operation of the wind turbine.

One particular conventional example of assembling a wind turbine with one or more internal webs is shown in U.S. Pat. No. 8,454,791 to Gau. The '791 Patent describes the use of a shear web setting device to cause the shear web to sit a consistent, small distance above an (optional) internal girder on a first shell portion when adhering a first end of the shear web to the internal girder. Such a device is alleged to avoid inconsistent positioning of the shear web relative to the internal girder along the length of the shear web and the first shell portion. Once this first end of the shear web is adhered into position, a second shell portion is closed over the second end of the shear web and the first shell portion, with these elements bonded and cured together at the corresponding junctures to produce the finalized wind turbine blade.

The final assembly step of the conventional method described in the '791 Patent may be referred to as a "bond line curing step" because several bond lines of adhesive material are provided for connecting elements together on the leading and trailing edges of the first and second shell portions and on the second or top end of the internal web. However, it has been discovered that during this bond line curing step, which is performed using a heated mould and/or heated air blown into the interior of the wind turbine blade, the considerable heat for curing also sometimes causes thermal distortions of the first and second shell portions, especially in locations between the leading and trailing edges (typically clamped together by the mould).

Such thermal distortions can move the second shell portion a sufficient amount to compromise the adhesive bond formed between the top end of the internal web and the internal girder on the second shell portion. For example, delamination or broken bonds can occur if the second shell portion expands too far away from the top end of the internal web. Alternatively, or additionally, adhesive voids can occur if the second shell portion moves too close to—or contacts—the top face of the internal web, pushing adhesive away from the contact region. These delaminations or adhesive voids can be one source of blade structural failure when the wind turbine blades are put into use on a wind turbine.

The failure to form a good adhesive bond between these elements of the wind turbine blade undermines the entire purpose of adding structural internal elements, so it is desired to provide a method and apparatus for assembling these wind turbine blades in such a manner to avoid the problems associated with potential thermal distortions during final curing of a wind turbine blade. To this end, a more reliable method and apparatus for assembling wind turbine blades with internal web(s) is desired by wind turbine operators and manufacturers to enhance the structural reliability of the wind turbine blade.

SUMMARY

A method and apparatus are described herein for assembling a wind turbine blade in such a manner including a pre-curing of adhesive bonds which could potentially be impacted by thermal deformation effects during full cure of the blade, to thereby achieve the objectives set forth above, including higher reliability of components used on a wind turbine.

In accordance with one embodiment of the invention, a method of assembling a wind turbine includes coupling a bottom end of an internal web with a first outer shell member of the blade. The method continues with applying an adhesive material to a top end of the internal web and to edges of the first outer shell portion. A second outer shell portion is engaged with the edges of the first outer shell portion and also with the top end of the internal web, to enclose the internal web inside the first and second outer shell portions. Localized heat energy is then applied to the adhesive material at the top end of the internal web to pre-cure that adhesive material and thereby bond the top end of the internal web with the second outer shell portion. After pre-curing the adhesive material at the top end of the internal web, the method continues by applying heat energy to the first and second outer shell portions to cure the adhesive material at the edges of the first outer shell portion and thereby bond the first and second outer shell portions together. The pre-curing of the adhesive material at the internal web allows the adhesive bond formed between the internal web and the outer shell to withstand any stresses caused by thermal deformation or stress in the outer shell during the final curing of the wind turbine blade. In embodiments, the said application of heat energy to the first and second outer shell portions to cure the adhesive material at the edges of the first outer shell portion may be initiated only after adhesive at the said internal web bond has been pre-cured to 8% or more of its final 100% cured state. Preferably, the said application of heat energy to the first and second outer shell portions may be initiated only after adhesive at the said internal web bond has been pre-cured to 10% or more of its final 100% cured state. Preferably, the degree of cure of the internal web bond adhesive may be monitored by means of a thermocouple located at or near said web flange.

In one aspect, the internal web includes a flange defining the top end. In such an aspect, the application of localized heat energy is completed by engaging a heater mat into contact with an underside of the flange at the top end of the internal web, and operating the heater mat to supply the localized heat energy at the flange and thereby heat the adhesive material to pre-cure the adhesive material. The heater mat is engaged in contact with the underside of the flange by removably coupling a rigid holding strip with the flange so as to secure the heater mat between the holding strip and the underside of the flange at the top end of the internal web. The rigid holding strip in such embodiments is formed from a heat insulating material such as an insulative foam such that heat energy is primarily directed through the flange to the adhesive material during operation of the heater mat.

In another aspect of the method, the rigid holding strip is removably coupled with the flange by connecting the rigid holding strip to the flange with a plurality of shear pins extending into the flange. The shear pins are configured to break when a predetermined removal force is mechanically applied to the rigid holding strip or to the heater mat, but the shear pins are not affected by heightened temperatures caused during pre-cure or full cure heating. To disengage the heater mat and the rigid holding strip from the flange of the internal web, a user pulls a line connected with a longitudinal end of the heater mat to apply the predetermined removal force and thereby break the shear pins, which enables pulling of the rigid holding strip and the heater mat out of engagement with the flange after pre-curing of the adhesive material is completed. In embodiments where the flange includes opposed first and second portions extending in opposite directions from a central reinforcement part of the internal web, the heater mat is positioned by wrapping the heater mat around a root end of the internal web such that the heater mat extends along the underside of the flange at both the first and second portions of the flange. It will be understood that alternative arrangements are possible for the heater mat, including directly connecting the heater mat to the flange with shear pins or similar connectors, with or without any additional heat transfer members included in the assembly.

In yet another aspect of the method, the first and second outer shell portions define a longitudinal span length of the wind turbine blade, while the internal web defines a first longitudinal length extending along a majority of the span length. The applying of localized heat energy occurs in such embodiments along only a pre-cure region including a root end of the internal web and extending along a partial portion of the first longitudinal length.

In other embodiments, the method also includes monitoring a pre-curing temperature of the adhesive material at the top end of the internal web during the applying of localized heat energy. The amount of curing that has occurred at the adhesive material at the top end of the internal web can then be determined based on the pre-curing temperature. The step of applying heat energy to the first and second outer shell portions to fully cure the wind turbine blade may be initiated when the amount of curing that has occurred at the adhesive material at the top end of the internal web reaches at least 12% of a full cure. Alternatively, this step of applying heat energy to perform the full cure of the wind turbine blade may be initiated at some other amount of curing in the pre-cure step, up to and including 100% cure of the adhesive material in the pre-cure of some embodiments. Thus, the full cure process can be held off until the adhesive bonds of the internal web to the outer shell portions are fully cured, or partially cured to the point of not losing bond integrity during any small thermally induced movements in the outer shell caused during the full cure heating.

In another embodiment in accordance with the invention disclosed herein, an apparatus is provided for assembling a wind turbine blade including first and second outer shell portions and an internal web. The apparatus includes a mould with first and second mould halves defining surfaces on which the first and second outer shell portions are assembled. The mould halves are moveable between open and closed positions, and are also configured to apply heat energy to cure adhesive material in the blade. The apparatus also includes a localized heating device sized for placement adjacent a top end of the internal web, such that it can apply localized heat energy to pre-cure an adhesive material at the top end of the internal web. The pre-cure bonds the internal web to one of the first and second outer shell portions. A holding device of the apparatus removable engages with the top end of the internal web to position the localized heating device adjacent the top end. The apparatus also includes a controller operatively connected to the mould and the localized heating device. The controller is programmed to operate the localized heating device to pre-cure adhesive material at the top end of the internal web before operating the application of heat energy with the mould. Accordingly, the apparatus pre-cures the adhesive material at the internal web to enable the adhesive bond formed between the internal web and the outer shell to withstand any stresses caused by thermal deformation or stress in the outer shell during the final curing of the wind turbine blade.

In one aspect of the apparatus, the localized heating device is a flexible heater mat. The holding device further includes a rigid strip of heat insulating material with a plurality of shear pins configured to extend into connection with the top end of the internal web to sandwich the localized heating device between the internal web and the rigid strip of heat insulating material. The apparatus in some embodiments further includes a temperature sensor connected to the controller and positioned to monitor a pre-curing temperature of the adhesive material at the top end of the internal web during the applying of localized heat energy. This temperature is used to determine an amount of curing that has occurred during the pre-curing of the adhesive material at the top end of the internal web, which can then be used to control when to begin the full curing process for the wind turbine blade.

These features of the method and apparatus for assembling a wind turbine may be combined in any arrangement without departing from the scope of the invention.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 3A is a side cross-sectional view of one embodiment of the apparatus for assembling a wind turbine in accordance with the invention, the apparatus including a mould with first and second mould halves, and this view illustrating a first step of a method of assembly in which fiber composite materials have been laid into both mould halves to form shell portions, and the mould portions are in an open position;

FIG. 3B is a side cross-sectional view of the apparatus of FIG. 3A, showing a further step of the method of assembly in which adhesive material is placed on an internal girder located on a first of the shell portions, thereby to prepare for assembly of the first shell portion with an internal web constructed separately;

FIG. 3C is a side cross-sectional view of the apparatus of FIG. 3B, showing a further step of the method of assembly in which the internal web is lowered into position to be adhered to the internal girder of the first shell portion;

FIG. 3D is a side cross-sectional view of the apparatus of FIG. 3C, showing a further step of the method of assembly in which the internal web is attached in position on the internal girder of the first shell portion, with the adhesive material being cured, and further adhesive material has been added to a top free end of the internal web and to a top end of the first shell portion;

DETAILED DESCRIPTION

Figure 1:
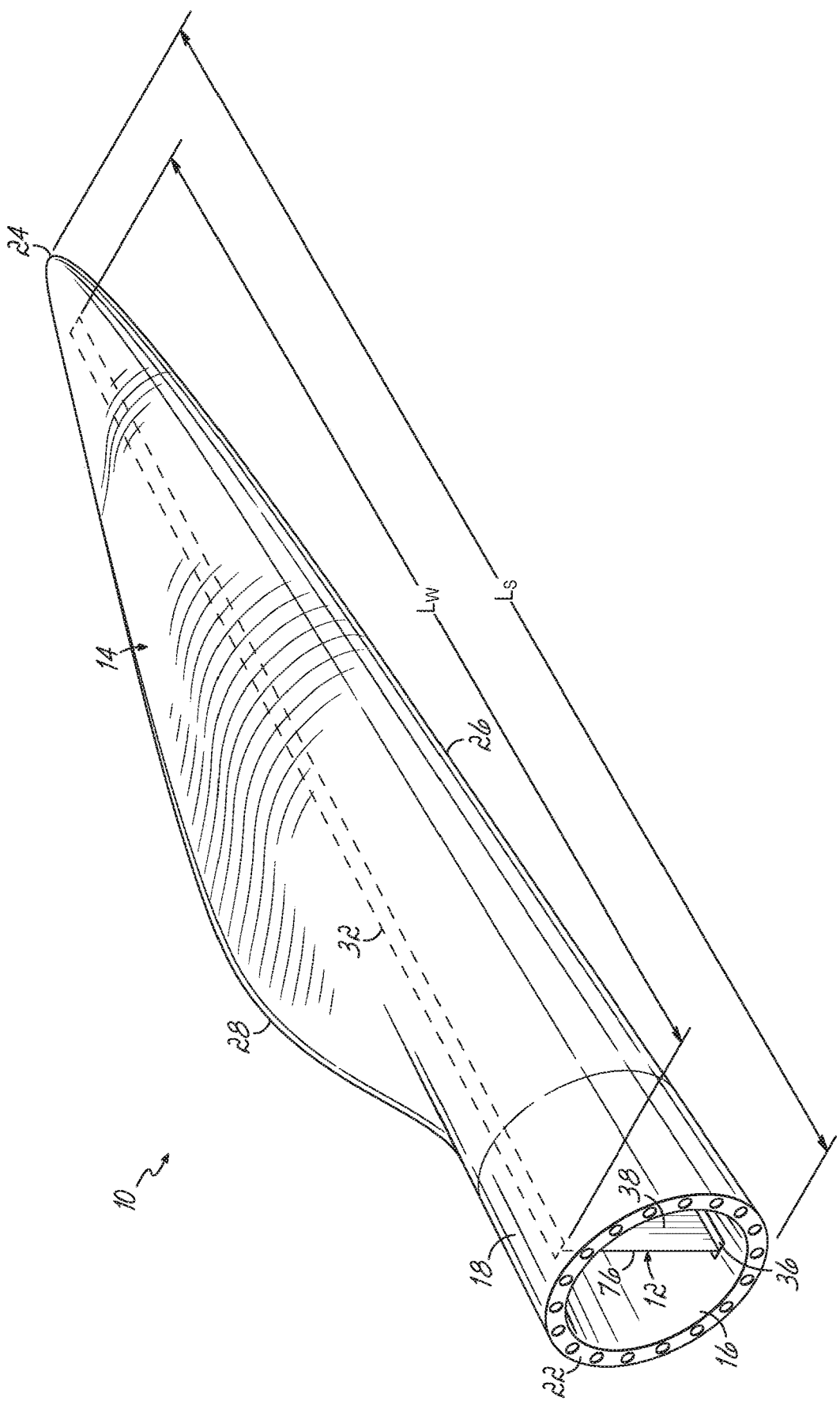
FIG. 1 is a top perspective view of one embodiment of a wind turbine blade with an internal web, which may be produced using the method and apparatus for assembling a wind turbine blade in accordance with the invention.

With reference to FIGS. 1 through 5, one exemplary embodiment of a wind turbine blade 10 having at least one internal web 12 and its corresponding method of assembly are shown in detail, in accordance with the principles of the invention. In this regard, the wind turbine blade includes an outer shell 14 defining the outermost aerodynamic profile of the blade 10 and formed from a first outer shell portion 16 and a second outer shell portion 18. To increase the strength and rigidity of the blade 10, the internal web 12 is bonded with the first and second outer shell portions 16, 18 during assembly of the blade 10. Advantageously, the adhesive bond at a junction between the internal web 12 and the second outer shell portion 18 is pre-cured by application of localized heat energy before the entire blade 10 is fully cured with additional heat energy, thereby assuring that any thermal deformations in the blade 10 which may occur during the full curing do not break the integrity of the adhesive bond formed between the internal web 12 and the second outer shell portion 18. The assembly of the wind turbine blade 10 therefore avoids the potential for any delaminations or adhesive voids that could otherwise occur at the internal web 12 and that could lead to structural failure in operation of a wind turbine including the wind turbine blade 10.

The blade 10 assembled according to this embodiment therefore improves the reliability of wind turbines using the blade 10. It will be appreciated that while only one internal web 12 in the form of an I-shaped shear web is shown in FIGS. 1 through 5, more than one structural reinforcement or web may be assembled with the outer shell 14 in accordance with other embodiments within the scope of this invention. Likewise, different types of internal structural reinforcement members may be positioned and bonded to the outer shell 14 using the methods described herein to achieve the associated advantages, without departing from the scope of the invention.

Figure 2:
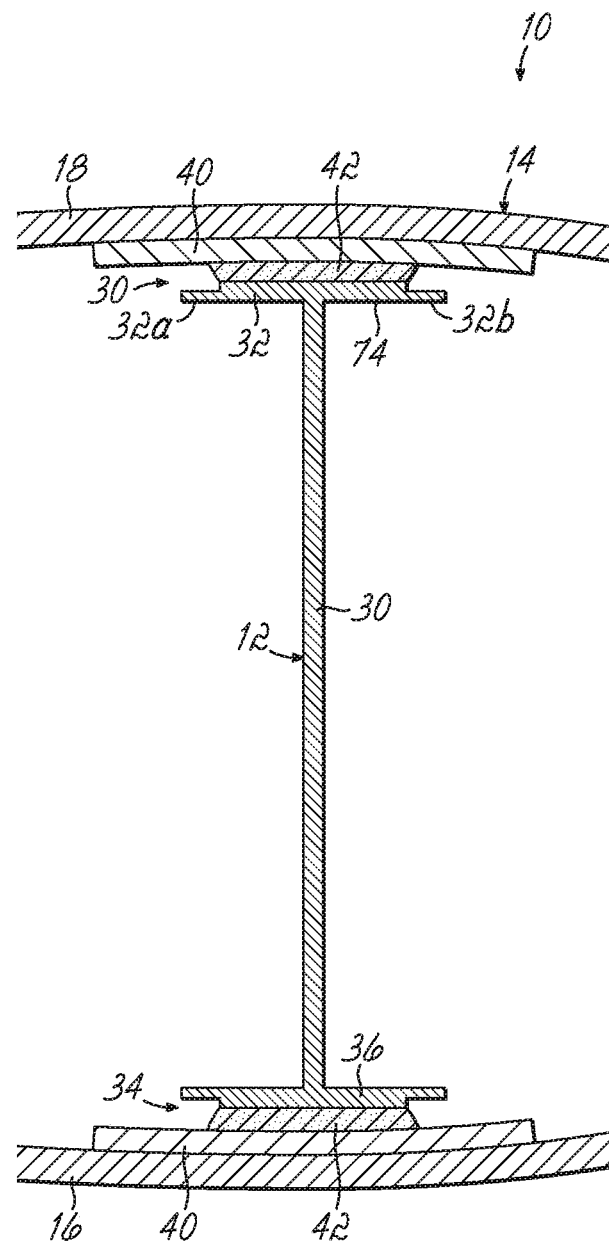
FIG. 2 is a cross-sectional front view through a central portion of the wind turbine blade of FIG. 1, including the internal web.

With particular reference to FIGS. 1 and 2, a fully assembled wind turbine blade 10 is shown in detail, the blade 10 being assembled by the apparatus and method of the invention described in further detail below. To this end, the outer shell 14 of the blade 10 is shown in FIG. 1 as a fully cured, unitary piece, which is typically formed from an adhesive bond between the first and second outer shell portions 16, 18 separately visible in the cross section shown in FIG. 2. The outer shell 14 is primarily formed from a fiber composite material in this embodiment, as well understood in the art of wind turbine construction. When fully assembled as shown in these Figures, the outer shell 14 defines the outermost aerodynamic shape or profile of the blade 10, including a longitudinal span length $L_S$ measured between a root end 22 to be connected to a rotor hub (not shown) of a wind turbine and a tip end 24 opposite the root end 22. The outer shell 14 also defines a leading edge 26 and a trailing edge 28 of the blade 10, each extending between the root end 22 and the tip end 24. As set forth in further detail below, the first and second outer shell portions 16, 18 are typically manufactured to be bonded together along these leading and trailing edges 26, 28, but other assembly configurations are possible in other non-illustrated embodiments of the wind turbine blade 10.

The internal web 12 is connected to the first and second outer shell portions 16, 18 so as to extend across an interior space defined within the outer shell 14, and thereby define another structural element or connection of these first and second outer shell portions 16, 18. As set forth above, this embodiment of the internal web 12 is generally I-shaped in cross section with a top end 30 defined by an upper flange 32, a bottom end 34 defined by a lower flange 36, and a central reinforcement part 38 extending between and connecting the upper flange 32 and lower flange 36. The internal web 12 therefore provides the shape and appearance of an I-beam when positioned between the first and second outer shell portions 16, 18 as shown in FIGS. 1 and 2. The internal web 12 is also typically manufactured as a separate piece before assembly with the first and second outer shell portions 16, 18. The internal web 12 is formed from a fiber composite material in this embodiment, with or without structure-enhancing or shape-defining inserts (not shown) which may be formed from fiber composite or other known materials.

With continued reference to FIGS. 1 and 2, the internal web 12 does not extend along a full amount of the longitudinal span length $L_S$ defined by the wind turbine blade 10. However, it is believed to be advantageous to increase the structural rigidity and stiffness proximate the root end 22 of the blade 10 and at least along 50% or more of the longitudinal span length $L_S$. Accordingly, the internal web 12 of this embodiment defines a first longitudinal length $L_W$ that is at least half, and preferably at least two-thirds or more of the longitudinal span length $L_S$ of the blade 10. To this end, the first longitudinal length $L_W$ of the internal web 12 extends along a majority of the longitudinal span length $L_S$ in this embodiment of the wind turbine blade 10, as shown most clearly in phantom in FIG. 1. It will be understood that the internal web 12 may be a unitary piece along the entire length thereof or may be assembled from several segments positioned in a line to form the entire length of the internal web 12 without departing from the scope of the invention. As will be described in further detail below, the pre-curing of the adhesive bond between the internal web 12 and the outer shell 14 may only be necessary along a partial portion of the first longitudinal length $L_W$.

As shown most clearly in FIG. 2, the outer shell 14 of the wind turbine blade 10 of this embodiment is also provided with optional internal girders 40 projecting along the longitudinal span length $L_S$ on the interior of the first and second outer shell portions 16, 18. The internal girders 40 may be formed from a fiber composite or metallic material, with the internal girders 40 placed at locations where the one or more internal webs 12 will be connected to the first and second outer shell portions 16, 18. The internal girders 40 are used to reinforce the structure of the first and second outer shell portions 16, 18, as well understood in the art of wind turbines. Thus, in the embodiment shown in these Figures, the top end 30 and the bottom end 34 of the internal web 12 are connected or bonded directly to these internal girders 40. Nevertheless, it will be appreciated that the internal girders 40 may be omitted in other embodiments consistent with the invention, in which case the adhesive bond would be formed between the fiber composite material of the first and second outer shell portions 16, 18 and the internal web 12. The adhesive material 42 bonding these elements together is also shown schematically in FIG. 2 for the sake of clarity.

Now turning with reference to FIGS. 3A through 3G, a series of steps is shown for a method of assembly for the wind turbine blade 10 according to one embodiment of the invention. The method advantageously includes the pre-curing of adhesive material 42 along the top end 30 of the internal web 12 to maintain the integrity of an adhesive bond between the internal web 12 and the second outer shell portion 18 during the remaining curing, demoulding, and finishing steps of assembling the wind turbine blade 10. These method steps also illustrate an apparatus for assembling the wind turbine blade 10, in accordance with another aspect of this disclosure.

At FIG. 3A, a first step of the method of assembly is shown in accordance with this embodiment. A mould 50 and a lift mechanism 52 are provided on a floor surface 54 of the production facility. The mould 50 and lift mechanism 52 may be separate elements in some embodiments, or these elements may be incorporated into a single blade assembly system. The first outer shell portion 16 is laying in a first mould half 56 with the interior of the first outer shell portion 16 facing upwardly. Likewise, the second outer shell portion 18 is laying in a second mould half 58 with the interior of the second outer shell portion 18 facing upwardly. The first and second outer shell portions 16, 18 are typically built up from layers of fiber composite material and cured in these first and second mould halves 56, 58 (the cavities in the mould halves 56, 58 thereby define the aerodynamic shape or profile of the blade 10 to be assembled). As shown in FIG. 3A, the internal girders 40 on each of the first and second outer shell portions 16, 18 have also been incorporated in this first step of the method of assembly. In this cured state, the first and second outer shell portions 16, 18 are ready to be assembled with the separately-formed internal web 12 to make the wind turbine blade 10.

Although the first and second outer shell portions 16, 18 remain in the mould 50 in which these elements are initially laid out and built in the example shown in these Figures, it will be understood that the first and second outer shell portions 16, 18 may also be retained during these steps in other retention devices, without departing from the scope of this invention. In this regard, the same equipment for initially building the outer shell portions 16, 18 does not need to be used for the method of assembly of this invention, but such equipment can be used as shown to expedite the blade manufacturing process.

Turning to FIG. 3B, the method of assembly continues with the placement of a bondline of adhesive material 42 being provided on the internal girder 40 of the first outer shell portion 16. The adhesive material 42 may be automatically dispensed, manually applied, or added to the internal girder 40 in the appropriate location by any other known methods. The specific adhesive material may vary based on the preferences of the blade manufacturer, but any conventional adhesive used for wind turbine blade construction may be used in accordance with this invention. The adhesive material 42 remains in an uncured state in this step at FIG. 3B.

At a further step shown in FIG. 3C, the method of assembly continues by placing the internal web 12 into contact with the bondline of adhesive material 42 at the first outer shell portion 16. More particularly, the internal web 12 is accurately positioned above the adhesive material 42 and then lowered into position so that the lower flange 36 at the bottom end 34 of the internal web 12 engages the adhesive material 42 on the internal girder 40 of the first outer shell portion 16. This positioning and lowering of the internal web 12 into the correct position may be automatically performed by a positioning arm 60 associated with the lift mechanism 52 as schematically shown in FIG. 3C. Of course, alternative mechanisms may also be used to accurately position the internal web 12 as desired. The lift mechanism 52 may continue to hold the internal web 12 in the desired position with the bottom end 34 in the adhesive material 42 during a curing step that is carried out at this step as well. The curing may be done by application of heat energy by the first mould half 56, in one example. Alternatively, a separate heater device (not shown) may be used to apply the heat needed to cure the adhesive material 42 and finalize the bond or coupling between the internal web 12 and the first outer shell portion 16. In embodiments with multiple internal webs 12 in the interior of the wind turbine blade 10, all of the internal webs 12 would be positioned and an adhesive bond cured before proceeding to the next step.

Continuing to FIG. 3D, the method of assembly then continues by applying a further amount of the adhesive material 42 to a top end 30 of the internal web 12 and also to a leading edge 62 and a trailing edge 64 defined by the terminal boundaries of the first outer shell portion 16. Once again, the adhesive material 42 can be automatically dispensed, manually applied, or otherwise positioned in another conventional manner in the bondlines shown. The adhesive material 42 may be the same as the one used in previous steps of the method, but it may also define different conventional adhesive formulations depending on the preferences of the manufacturer. The adhesive material 42 on the top end 30 of the internal web 12 forms a bondline that is to be connected to the second outer shell portion 18, specifically at the internal girder 40 of that element in this embodiment. Similarly, the adhesive material 42 on the leading edge 62 of the first outer shell portion 16 defines another bondline which is to be joined with a leading edge 66 of the second outer shell portion 18, to thereby form the shared leading edge 26 of the wind turbine blade 10. The adhesive material 42 on the trailing edge 64 of the first outer shell portion 16 defines a bondline for joining with a trailing edge 68 of the second outer shell portion 18, to thereby form the shared trailing edge 28 of the wind turbine blade 10. In short, the application of the adhesive material 42 in an uncured state puts the first outer shell portion 16 and the internal web 12 fully into condition for assembly with the second outer shell portion 18.

As set forth in further detail below, the adhesive material 42 on the top end 30 of the internal web 12 will be pre-cured by applying localized heat energy at the upper flange 32 of the internal web 12 during this method of assembly of the wind turbine blade 10. Before moving on to the step of FIG. 3E, in which the wind turbine blade 10 is further assembled and the internal web 12 is enclosed within the outer shell 14, it may be desired to removably couple the heating device 72 (an example of which is shown in FIG. 4A and described further below) used for the pre-curing function into position on the internal web 12. Adding the heating device 72 at this stage of the method of assembly is easier because an operator does not need to climb into an interior of an enclosed blade 10 (or have an automated system do the same) to prepare for the step of applying localized heat energy. However, performing this removable installation of the heating device 72 can be performed after the next step, if desired, and that option is shown schematically in FIGS. 3A through 3G.

Figure 3E:
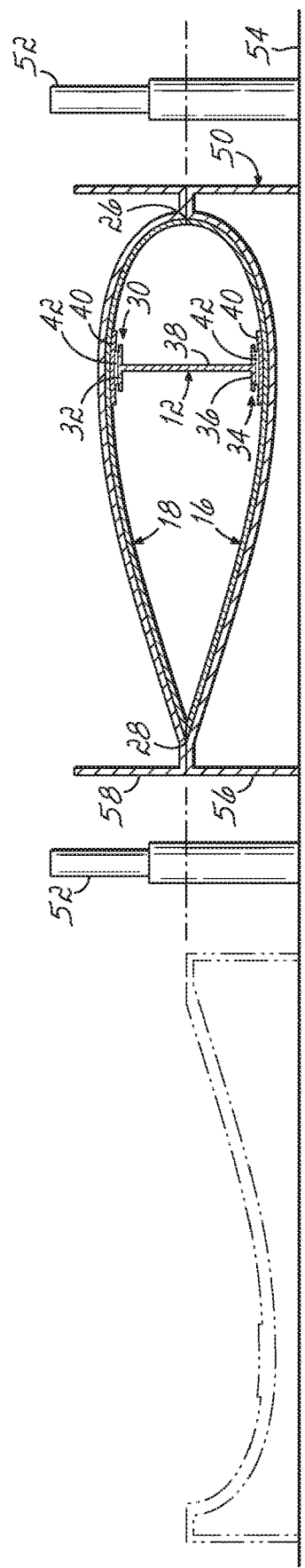
FIG. 3E is a side cross-sectional view of the apparatus of FIG. 3D, showing a further step of the method of assembly in which the second mould half is closed on top of the first mould half to join the first and second shell portions together while also joining the top free end of the internal web to an internal girder of the second shell portion.
Figure 4A:
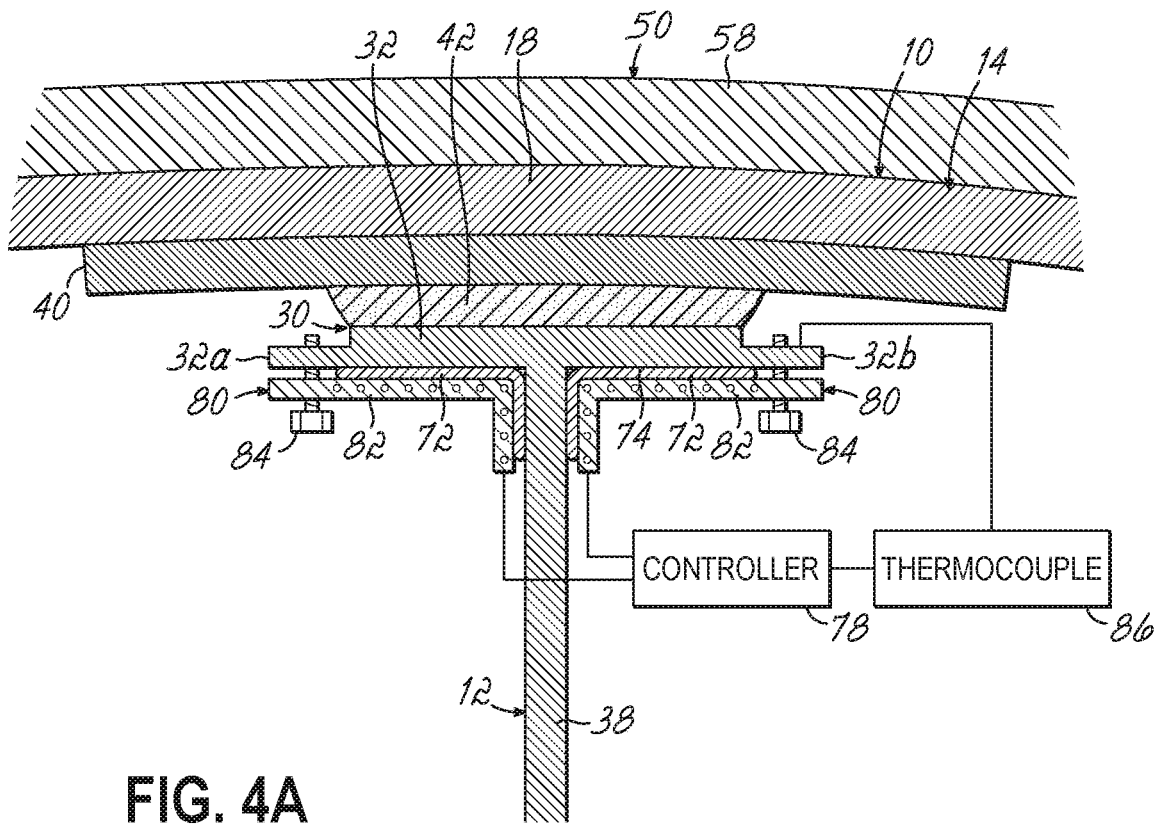
FIG. 4A is a detail view of the top free end of the internal web as indicated by encircled area 4A in FIG. 3F, showing further details of the heater mat connected to the internal web during this step of the method of assembly.

Turning to FIG. 3E, the mould 50 is moved to a closed position where the second mould half 58 is rotated to engage with and sit on top of the first mould half 56. When this step of the method is carried out with the mould halves 56, 58 on which the first and second outer shell portions 16, 18 are initially built up and cured, the first and second mould halves 56, 58 will typically reliably hold these portions in position during the movement because there has been no demoulding process performed for the outer shell 14 at this stage of the blade assembly. Regardless of the structure used to move the second outer shell portion 18, this movement step results in the second outer shell portion 18 engaging the first outer shell portion 16 and the internal web 12 at each of the bondlines of adhesive material 42 previously described with respect to FIG. 3D. More specifically, the leading edge 66 of the second outer shell portion 18 is joined to the leading edge 62 of the first outer shell portion 16 with uncured adhesive material 42; the trailing edge 68 of the second outer shell portion 18 is joined to the trailing edge 64 of the first outer shell portion 16 with uncured adhesive material 42; and the internal girder 40 of the second outer shell portion 18 is joined to the top end 30 of the internal web 12 with uncured adhesive material 42. As seen in FIG. 3E, this step encloses the internal web 12 within the outer shell 14 of the wind turbine blade 10 being assembled.

Figure 3F:
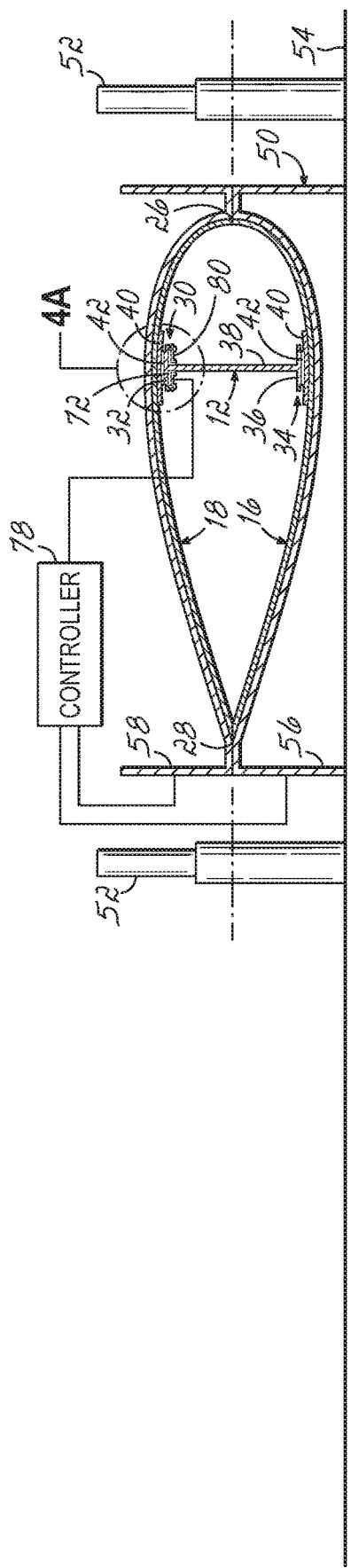
FIG. 3F is a side cross-sectional view of the apparatus of FIG. 3E, showing a further step of the method of assembly in which a heater mat is connected to the internal web adjacent the top free end for the purposes of pre-curing the adhesive material bonding the internal web to the second shell portion.

In the next step of the method of assembly for the wind turbine blade 10 shown in FIG. 3F, the application of localized heat energy is performed to pre-cure the bondline of adhesive material 42 connecting the internal girder 40 to the second outer shell portion 18. In order to provide this localized heating, the heating device 72 must be removably coupled to the blade 10 at a location proximate to the adhesive material 42 of this bondline. In order to better describe this heating device 72 and its operation, reference is now made to FIG. 4A, which is a detail view of the top end 30 of the internal web 12 in the method step of FIG. 3F.

FIG. 4A shows one embodiment of the heating device 72 that may be temporarily connected to the internal web 12 to perform localized heating in accordance with the methods of the invention described herein. The heating device 72 is a generally flexible heater mat 72 that is configured to closely engage with an underside 74 of the upper flange 32 of the internal web 12 on both sides of the central reinforcement part 38. To this end, the upper flange 32 defines first and second flange portions 32a, 32b extending in opposite directions from the central reinforcement part 38, with a portion of the underside 74 of the upper flange 32 formed by each of the first and second flange portions 32a, 32b. The heater mat 72 in this embodiment wraps around a root end 76 (shown in FIG. 5) of the internal web 12 such that it can extend as a unitary piece along the underside 74 of the upper flange 32 on both sides of the central reinforcement part 38. It will be understood that the heater mat 72 may alternatively be provided in multiple portions in other embodiments, such as a separate portion for each side of the central reinforcement part 38, without departing from the scope of the invention. In still further embodiments, the localized heating may be adequately provided by a heater mat 72 located only along one of the flange portions 32a, 32b without departing from the scope of the overall invention, but for the sake of illustration, the unitary belt-like construction of the heater mat 72 which wraps around the root end 76 of the internal web 12 will be shown as an exemplary embodiment in the Figures.

The heater mat 72 used for the localized heating may be a laminated heating mat available for other manufacturing processes and purposes. Such laminated heating mats are typically electrically actuated to provide heat energy at a controlled set point temperature, which may be adjustable based on the input power or other internal controls. In FIG. 4A, a controller 78 is schematically shown in black box form and may serve as the element which controls the temperature to which the heater mat 72 achieves during the pre-cure operation. This may be the same controller 78 of the entire assembly apparatus, e.g., the controller 78 that also monitors and controls functions of the mould 50 and/or the lift mechanism 52. Of course, different types of heating devices 72 may be used in other embodiments so long as the localized heating is provided for the pre-curing functionality.

The heater mat 72 will typically need to be retained in position at the underside 74 of the upper flange 32, and for this purpose, a holding device 80 is provided as shown in FIG. 4A. The holding device 80 in this embodiment includes a rigid holding strip 82 that is shaped to follow the contour of the internal web 12 at the location where the heater mat 72 is to be positioned. The holding device 80 also includes a plurality of shear pins 84 for removably connecting and holding the holding device 80 in position relative to the upper flange 32. Although only two shear pins 84 are shown in the cross section of FIG. 4A, it will be understood that a plurality of shear pins 84 may be connected to the first and second flange portions 32a, 32b along the length of the rigid holding strip 82. The shear pins 84 extend through the rigid holding strip 82 at a location just beyond where the heater mat 72 is located such that the shear pins 84 can be punched or otherwise driven upwardly into engagement with the upper flange 32 near the opposite ends of the upper flange 32. The shear pins 84 are manufactured to reliably maintain the coupling of the rigid holding strip 82 to the upper flange 32 during any heating or curing operation, but the shear pins 84 are also designed to break apart when a predetermined (mechanical) removal force is applied to these shear pins 84. That enables the removal of the heater mat 72 and the holding device 80 as set forth below.

The rigid holding strip 82 of this embodiment is preferably formed from a heat insulating material. More specifically, the rigid holding strip 82 is formed from a foam material which does not conduct heat energy well, and this forces the heat energy of the heater mat 72 to be applied to the adhesive material 42 as desired. When pinned into position with the shear pins 84, the heater mat 72 is sandwiched between the rigid holding strip 82 and the underside 74 of the upper flange 32, thereby providing the close contact of the heater mat 72 with the contour of the internal web 12 at this location. With the heat energy being encouraged by the heat insulating material of the rigid holding strip 82 to move in the opposite direction, e.g., through the upper flange 32, the localized heat energy can be applied in an efficient manner to conduct pre-curing of the adhesive material 42 at this bondline. Of course, other types of materials and arrangements may be provided for the holding device 80, including alternative mechanisms and methods of removably coupling it to the upper flange 32, so long as the heater mat 72 is still accurately positioned for delivering the localized heat energy while still being removable from the finished wind turbine blade 10. As described above, the removable installation of these elements on the internal web 12 may occur before closing the second outer shell portion 18 into engagement with the internal web 12 and the first outer shell portion 16.

In one particular alternative embodiment not shown in these Figures, the arrangement of the localized heating device 72 may be modified such that the heating element 72 is directly coupled in a removable manner to the upper flange 32, for example using shear pins 84 or a similar connector. In such embodiments, additional optional heat transfer elements may be positioned between the heating device and the flange 32 when necessary to ensure good heat transfer contact between these elements to move the heat into the adhesive material 42 for pre-curing. Thus, the overall appearance of such embodiments may be similar to that shown in FIG. 4A, but with the elements in different locations. It will be understood that regardless of the particular structural arrangement of the localized heating device 72 and associated elements, this device must be located so that it transfers heat to pre-cure the adhesive material 42 in accordance with the methods of assembly described herein.

Having described the elements performing the pre-curing function in detail, reference is again made to FIG. 3F where the next step of the method of assembly for the wind turbine blade 10 is shown. With the heater mat 72 and holding device 80 in position on the upper flange 32 as shown, the pre-curing of the adhesive material 42 at the top end 30 of the internal web 12 is commenced by actuating the heater mat 72. In one example, the controller 78 is operatively coupled to the heater mat 72 as shown and controls the actuation and heating output of the heater mat 72. The heat generation may be monitored by one or more temperature sensors, such as the thermocouple 86 operatively coupled to the controller 78 and schematically shown in FIG. 4A. Other temperature sensors and control elements will be readily understood to be acceptable in alternative embodiments of the invention.

Continuing with this example, it has been determined by the inventors that setting the heater mat 72 to an output temperature of about 80 degrees Celsius is sufficient to begin curing the adhesive material 42 on the upper flange 32. The thermocouple 86 is used to monitor the temperature at the adhesive material 42, which can be correlated by the controller 78 using known methods to identify an amount or percentage of curing done at the adhesive material 42. Thus, in one example, the pre-curing applied by the localized heat energy at FIG. 3F is conducted until the adhesive material 42 reaches a set percentage of a full cure, and this set percentage may be a partial cure or a full 100% cure. It is believed that a pre-cure of the adhesive material 42 of at least 8% or at least 10% or at least 12% (of the full cure) is sufficient to maintain the integrity of the adhesive bonds when the full cure is applied with heat energy on the entire wind turbine blade 10. In this regard, the next step of the method of assembly described below is initiated in one embodiment when the amount of curing that has occurred at the adhesive material 42 at the top end 30 of the internal web 12 has been determined by the controller 78 to be 8%, or 10%, or 12% or more of a full cure. It will be understood that this next step may be delayed until a higher percentage of cure is reached, including 100% in some alternative embodiments. In embodiments, the degree of curing of the bondline adhesive may be monitored using a thermocouple at or near the web flange. A readout from the thermocouple may be monitored over time to generate a value for a degree of curing.

Figure 3G:
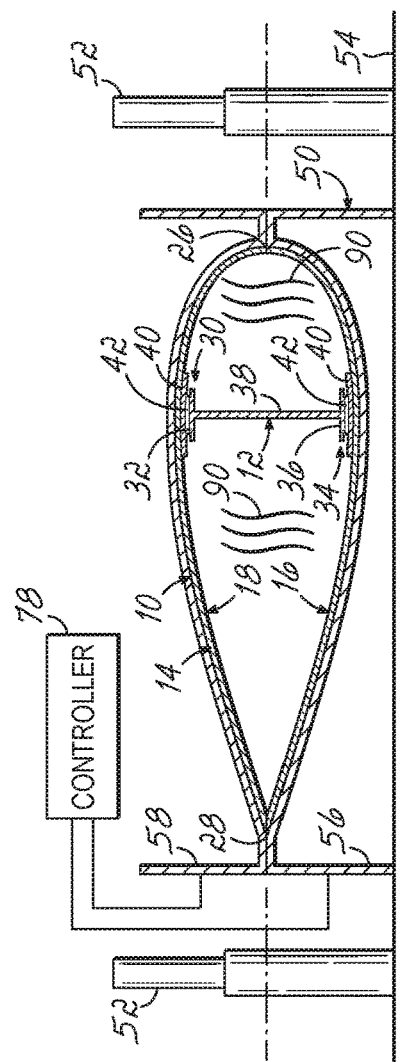
FIG. 3G is a side cross-sectional view of the apparatus of FIG. 3F, showing a further step of the method of assembly in which the adhesive material joining the first and second shell portions is cured to finalize assembly of the wind turbine blade with the internal web.

After the pre-curing of the adhesive material 42 at the top end 30 of the internal web 12 has been completed to a sufficient degree, as monitored by the thermocouple 86 and the controller 78, the method of assembly of the wind turbine blade 10 continues to the step shown in FIG. 3G. At this part of the method, heat energy is applied to the first and second outer shell portions 16, 18, e.g., the entirety of the wind turbine blade 10, to fully cure all the remaining uncured adhesive material 42, including the bondlines along the leading edge 26 and trailing edge 28 of the wind turbine blade 10. If the pre-cure of the adhesive material 42 at the top end 30 of the internal web 12 is stopped at 12% or some other value less than a full cure, the heat energy applied (shown schematically at FIG. 3G by heat waves 90) also fully cures that adhesive material 42 as well. As understood in the art of wind turbine blade construction, the heat energy for the full cure may be provided by the first and second mould halves 56, 58, which are operatively coupled to the controller 78 for actuating this heating, and/or by delivery of heated cavity air inside the interior of the wind turbine blade 10 defined by the outer shell 14. This heating of the entire wind turbine blade 10 cures all the adhesive bonds and connections such that the wind turbine blade 10 is a solid, unitary construction ready for demoulding from the mould 50, as well as other finishing and installation steps.

As briefly described above, during this full cure process step of heating the entire wind turbine blade 10, the first and second outer shell portions 16, 18 may thermally deform a small amount as a result of the temperatures applied. However, as a result of the adhesive connection being pre-cured at the top end 30 of the internal web 12 (and fully cured at the bottom end 34 of the internal web 12), these small deformations do not cause a loss of integrity of the bonds formed between the internal web 12 and the outer shell 14. In this regard, the problems of adhesive void formation and/or delamination at this juncture are avoided thanks to the method of assembly set forth in FIGS. 3A through 3G. Consequently, the wind turbine blade 10 assembled with this method and apparatus may be more reliable in field operation than conventional designs, lessening any maintenance or replacement burdens on the final operators of wind turbines.

In FIG. 3G, the upper flange 32 is shown with the heater mat 72 and the holding device 80 already removed before the full cure heating begins. However, it is often the case that these elements are not removed until after the full cure is completed, and perhaps even after the demoulding of the blade 10 from the mould 50. Regardless of when this removal occurs, the disassembly of these elements used for the pre-cure step of the method of assembly may be performed as follows.

Figure 4B:
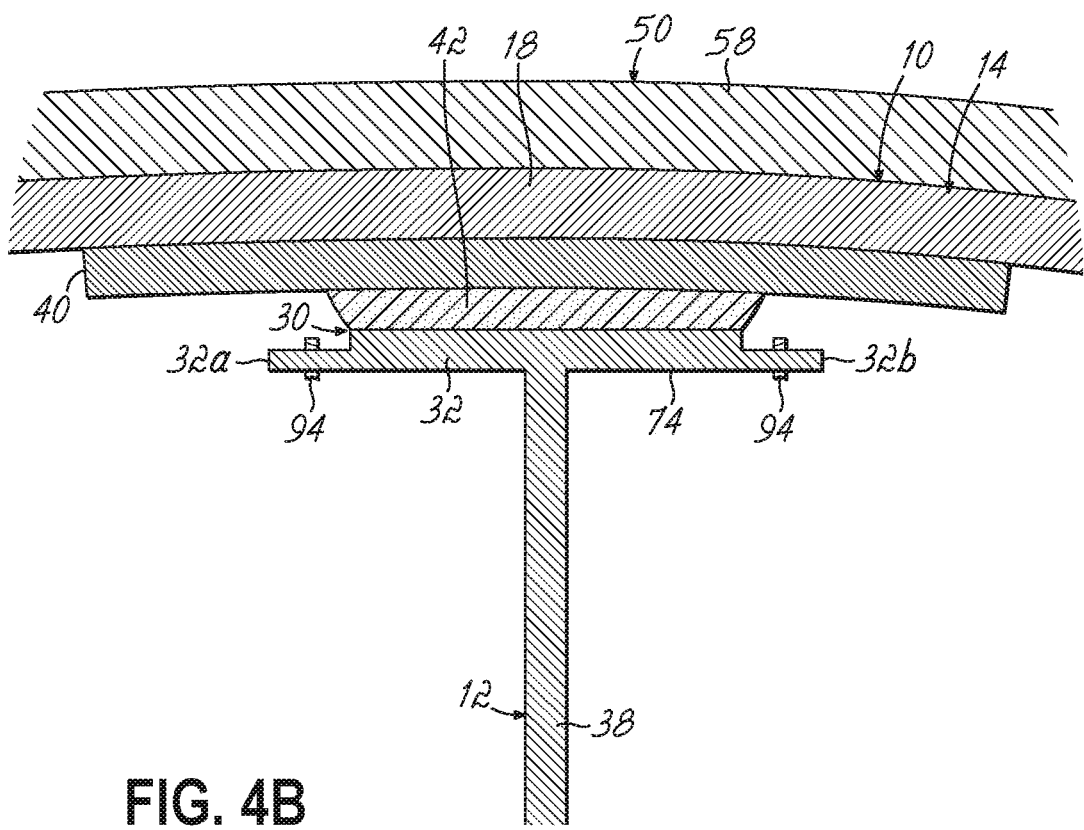
FIG. 4B is a detail view of the top free end of the internal web similar to FIG. 4A, but showing a step of the method of assembly after the pre-curing of adhesive material is completed and after the heating mat is removed.
Figure 5:
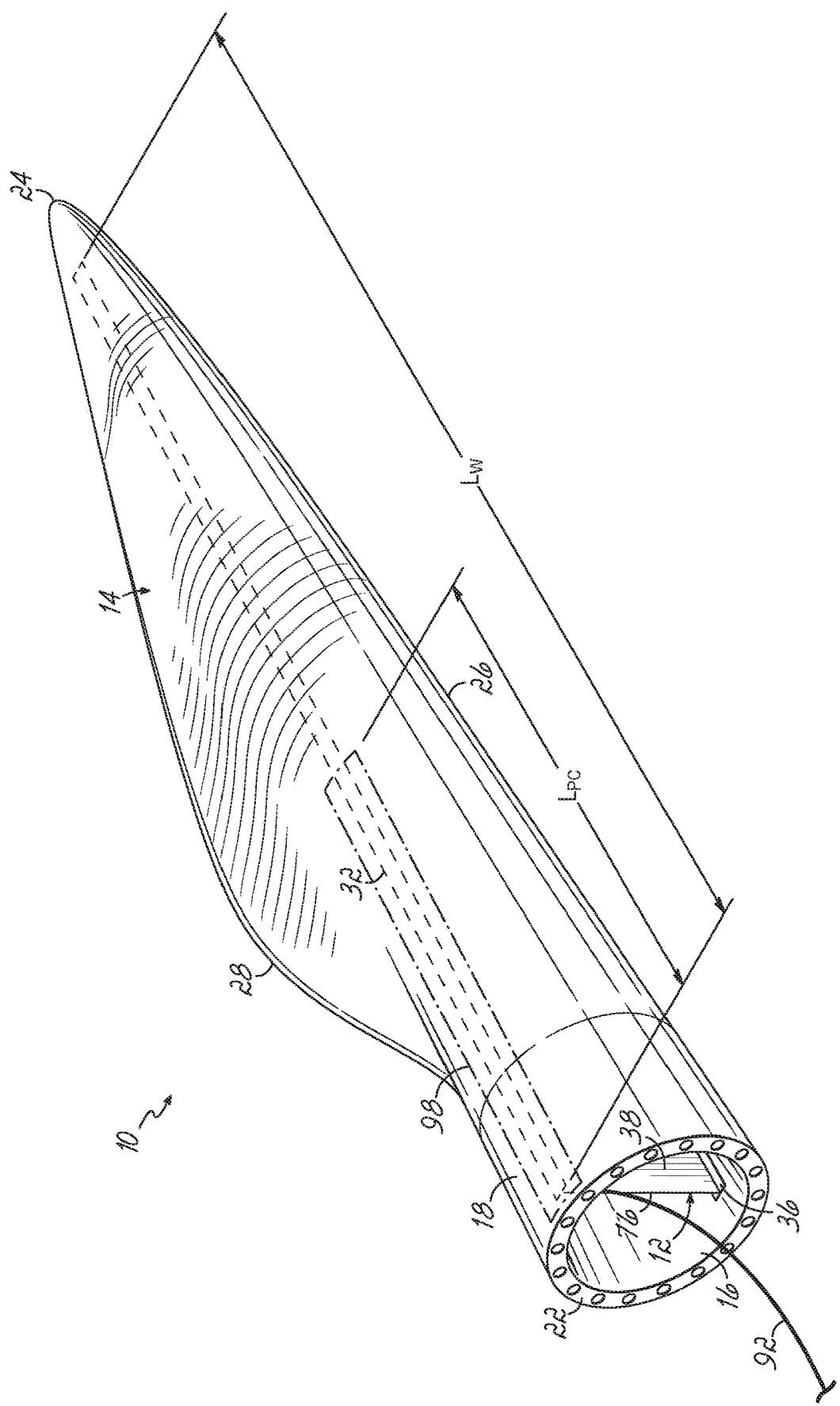
FIG. 5 is a top perspective view of the wind turbine blade with an internal web of FIGS. 1 through 4B, showing further details of the heating mat added during the step of the method in FIG. 3F in which the adhesive material at the top free end of the internal web is pre-cured, as well as one example of a removal mechanism for the heating mat.

With reference to FIGS. 4B and 5, the heater mat 72 and/or the holding device 80 further includes a removal mechanism for making removal of these temporary components easy for the assembly personnel. In the example shown in FIG. 5, this removal mechanism is defined by a line 92 connected with one longitudinal end (not shown) of the heater mat 72, which is located down the span length of the wind turbine blade 10 away from the root end 22. The line 92 may be defined by a cable, a cord, or any other such device that is capable of withstanding the heat applied during the pre-cure and curing steps of the method of assembly. When it is desired to remove the heater mat 72 and the rigid holding strip 82 from the upper flange 32, the line 92 is pulled with a mechanical removal force that is sufficient to break or shear the plurality of shear pins 84 removably coupling the rigid holding strip 82 to the upper flange 32 of the internal web 12. The heater mat 72 and the holding device 80 are designed so as to not break apart when such mechanical forces are applied, which enables all of the force to be transferred to break the removable connection at the shear pins 84 previously described. Continuing to pull the line 92 will cause the heater mat 72 and the holding device 80 to be sequentially removed along their longitudinal lengths from the interior of the wind turbine blade 10. These elements can then be reconfigured with new shear pins 84 for use during the construction of the next wind turbine blade 10. The broken ends 94 of the shear pins 84 remain lodged in the outermost portions of the upper flange 32 of the internal web 12 following the removal process, as shown most clearly in FIG. 4B, but this does not affect the structural integrity of the wind turbine blade components in any meaningful way.

Also as shown in FIG. 5, even though the bondline defined by the adhesive material 42 on the top end 30 of the internal web 12 extends along an entirety of the first longitudinal length $L_W$ of the internal web 12, the pre-curing is typically only performed along a pre-cure region 98 that extends along a partial portion of the first longitudinal length $L_W$. For example, the pre-cure region 98 is shown in dashed line in FIG. 5 and defines a pre-cure length $L_{PC}$ of about half of the first longitudinal length $L_W$. The pre-cure region 98 is limited in length and kept at and near the root end 76 of the internal web 12 because this is the larger cross section region of the outer shell 14 and the location where thermally-induced deformations during curing tend to be most prevalent in the first and second outer shell portions 16, 18. To this end, the thicker portions of the first and second outer shell portions 16, 18 are more prone to thermal deformation and stress, so this is the region where pre-curing can help avoid any of the potential problems that may otherwise be caused with the adhesive bonds during the full curing process. Therefore, in order to limit the length of the heater mat 72 and the pre-curing process to areas where the pre-curing is most important or beneficial, the embodiment of the method and apparatus shown in these Figures applies the heater mat 72 and the pre-cure localized heat energy only along the pre-cure region 98 as shown.

Of course, it will be understood that in further embodiments within the scope of this invention, the length of the pre-cure region 98 may be modified, even to the full extent of the first longitudinal length $L_W$, should that be desired by a wind turbine blade manufacturer. The various modifications described throughout this specification to the exemplary embodiment shown in the Figures may be used in any combination to achieve different embodiments of the apparatus and method including the advantageous pre-cure of the adhesive bond between the internal web 12 and the second outer shell portion 18.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination, including with any type of wind turbine blade with internal reinforcement structures. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of assembling a wind turbine blade including first and second outer shell portions and an internal web, the method comprising:
    coupling a bottom end of the internal web with the first outer shell portion;
    applying an adhesive material to a top end of the internal web and to edges of the first outer shell portion;
    engaging the second outer shell portion with the edges of the first outer shell portion and with the top end of the internal web to enclose the internal web inside the first and second outer shell portions;
    applying localized heat energy to the adhesive material at the top end of the internal web to pre-cure the adhesive material and thereby bond the top end of the internal web with the second outer shell portion; and after pre-curing the adhesive material at the top end of the internal web, applying heat energy to the first and second outer shell portions to cure the adhesive material at the edges of the first outer shell portion and thereby bond the first and second outer shell portions together.

2. The method of claim 1, wherein the internal web includes a flange defining the top end, and applying localized heat energy to the adhesive material at the top end of the internal web further comprises:

engaging a heater mat into contact with an underside of the flange at the top end of the internal web; and operating the heater mat to supply the localized heat energy at the flange and thereby heat the adhesive material to pre-cure the adhesive material.

3. The method of claim 2, wherein engaging a heater mat into contact with the underside of the flange further comprises:

removably coupling a rigid holding strip with the flange so as to secure the heater mat between the holding strip and the underside of the flange at the top end of the internal web.

4. The method of claim 3, wherein the rigid holding strip is formed from a heat insulating material such that heat energy is primarily directed through the flange to the adhesive material during operation of the heater mat.

5. The method of claim 3, wherein removably coupling the rigid holding strip with the flange further comprises:

connecting the rigid holding strip to the flange with a plurality of shear pins extending into the flange, the shear pins being configured to break when a predetermined removal force is applied to the rigid holding strip.

6. The method of claim 5, further comprising:

pulling a line connected with a longitudinal end of the heater mat to apply the predetermined removal force and thereby break the shear pins to pull the rigid holding strip and the heater mat out of engagement with the flange after pre-curing the adhesive material.

7. The method of claim 2, wherein the flange includes opposed first and second portions extending in opposite directions from a central reinforcement part of the internal web, and engaging the heater mat into contact with the underside of the flange further comprises:

wrapping the heater mat around a root end of the internal web such that the heater mat extends along the underside of the flange at both the first and second portions of the flange.

8. The method of claim 1, wherein the first and second outer shell portions define a longitudinal span length of the wind turbine blade, the internal web defines a first longitudinal length extending along a majority of the span length, and the applying of localized heat energy occurs only along a pre-cure region including a root end of the internal web and extending along a partial portion of the first longitudinal length.

9. The method of claim 1, further comprising:

monitoring a pre-curing temperature of the adhesive material at the top end of the internal web during the applying of localized heat energy; and determining an amount of curing that has occurred at the adhesive material at the top end of the internal web based on the pre-curing temperature.

10. The method of claim 9, further comprising:

initiating the step of applying heat energy to the first and second outer shell portions when the amount of curing that has occurred at the adhesive material at the top end of the internal web has been determined to reach at least 12% of a full cure.

11. The method of claim 9, further comprising:

initiating the step of applying heat energy to the first and second outer shell portions when the amount of curing that has occurred at the adhesive material at the top end of the internal web has been determined to reach about 100% of a full cure.

12. The method of claim 1, wherein coupling a bottom end of the internal web with the first outer shell portion further comprises:

applying an adhesive material to the first shell portion and placing the bottom end of the internal web into contact with the adhesive material on the first shell portion; and curing the adhesive material between the first shell portion and the bottom end of the internal web before applying an adhesive material to the top end of the internal web and to the edges of the first outer shell portion.

13. An apparatus for assembling a wind turbine blade including first and second outer shell portions and an internal web, the apparatus comprising:

a mould including first and second mould halves defining surfaces on which the first and second outer shell portions are assembled, the first and second mould halves being moveable between open and closed positions and being configured to apply heat energy to cure adhesive material in the wind turbine blade;

a localized heating device sized for placement adjacent a top end of the internal web and configured to apply localized heat energy to pre-cure an adhesive material at the top end of the internal web to bond the internal web to one of the first and second outer shell portions;

a holding device that is removably engageable with the top end of the internal web to position the localized heating device adjacent the top end; and a controller operatively connected to the mould and to the localized heating device, the controller being programmed to operate the localized heating device to pre-cure adhesive material at the top end of the internal web before operating an application of heat energy with the mould.

14. The apparatus of claim 13, wherein the localized heating device further comprises:

a flexible heater mat configured to follow a contour of the top end of the internal web when placed adjacent the top end of the internal web.

15. The apparatus of claim 13, wherein the holding device further comprises:

a rigid strip of heat insulating material including a plurality of shear pins configured to extend into connection with the top end of the internal web to sandwich the localized heating device between the internal web and the rigid strip of heat insulating material.

16. The apparatus of claim 13, further comprising:

a temperature sensor connected to the controller and positioned to monitor a pre-curing temperature of the adhesive material at the top end of the internal web during the applying of localized heat energy, such that the controller can determine an amount of curing that has occurred at the adhesive material at the top end of the internal web based on the pre-curing temperature.

* * * * *